Dec. 27, 1955
C. L. COHEN
2,728,882
COMPUTER STABILIZING SYSTEM
Filed March 5, 1953
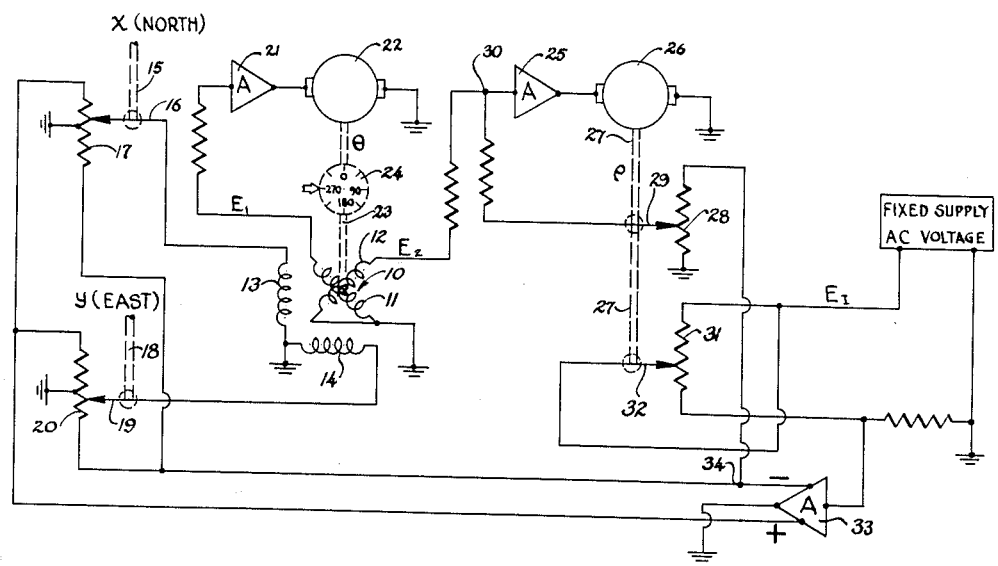
INVENTOR
*Charles L. Cohen*
BY *Scrivener and Parker*
ATTORNEYS

United States Patent Office 2,728,882
Patented Dec. 27, 1955

2,728,882

COMPUTER STABILIZING SYSTEM

Charles L. Cohen, Hyattsville, Md., assignor, by mesne assignments, to ACF Industries, Incorporated, a corporation of New Jersey Application March 5, 1953, Serial No. 340,501

5 Claims. (Cl. 318—19)

This invention relates to computers and, more particularly to a novel means for increasing the stability and accuracy of that type of computer known in the art as an analogue computer. Though this invention may be used for other purposes, it is particularly adapted for use in analogue computers wherein voltage inputs must vary between very wide limits, as for example in range-bearing computers utilizing a resolver servo system for rectangular-to-polar transformation wherein a low voltage input normally represents a short range from a reference point to an object, whereas a high voltage input may represent a long range. At high voltage input, i. e. long range, the voltage input is sufficient to operate the resolver servomotor to move the resolver to a correct position of zero voltage thereby effecting an accurate computation of range and bearing. At low voltage input, however, i. e. short range, when high accuracy is frequently most desired, resolver motor friction and stray electrical noise pick-up may cause the servo-motor to stop short of the correct position, resulting in large inaccuracies in the computed range and bearing. It is with overcoming this latter error that this invention is primarily concerned.

Heretofore, efforts to reduce this error have usually involved the use of a variable gain amplifier located between the resolver and the driving motor thereof, with the gain of the amplifier being varied according to some inverse function of the range. The primary difficulty with this solution resides in the fact that stray electrical noise output from the resolver also receives this extra amplification resulting in faulty positioning of the resolver motor for short-range low-voltage inputs.

This invention overcomes this difficulty by increasing the gain of the input circuits ahead of the resolver (i. e. ahead of the circuits where electrical noise enters the system) whenever the range becomes small so that the input voltage to the resolver servo-motor will be within the motor's operative limits to move the resolver rotor to true zero voltage position. This increased gain in the input circuits would, in a range-bearing computer, produce a large range error. To prevent this, an identical offsetting decrease in gain behind the resolver but ahead of the range circuit is actuated simultaneously with the aforementioned gain-increase so that the resulting range is not affected thereby.

An object of the invention is therefore to provide a novel means for stabilizing analogue computers.

Another object of the invention is to provide analogue-computer stabilizing means which allow the computer to produce uniformly accurate results over a wide range of input values.

Another object of the invention is to provide a stabilizing system for analogue computers which increases the gain of input circuits as output values decrease, and vice-versa, so that the overall functioning of the computer remains uniform over its entire designed range of operation.

Another object of the invention is to provide a simple stabilization system for analogue computers utilizing resolver servo systems which vary the gain of input circuits ahead of the resolver in response to outputs derived from circuits behind the resolver.

Another object of the invention is to provide in a range-bearing computer utilizing a resolver servo system means responsive to range output for varying the gain of input circuits to increase the sensitivity of response of the resolver servo motor over the entire range of input voltages.

Still another object of the invention is to provide an error eliminating system for analogue computers utilizing a resolver servo system which obviates the use of variable gain amplifiers to eliminate output errors resulting from low input values.

Other objects and their attendant advantages will become apparent when the following detailed description is read in conjunction with the accompanying drawing. It will be expressly understood, however, that the disclosed embodiment is only illustrative of the invention.

In the drawing there is illustrated a schematic representation of an analogue computer incorporating a resolver servo system for transforming the position of an object located with respect to the origin of north and east axes into polar coordinates of range and bearing from the origin.

It is contemplated that the disclosed embodiment of the computer derives a bearing or azimuth, $\theta$, of an object, hereafter referred to as a target, from a fixed reference point with respect to a given direction, say north, and a range $\rho$ which may vary between limits of the order of 100 yards to 30,000 yards. The initial position of the object from the reference point may be determined as X number of yards north of the point and Y number of yards east of the point. The resultant of X and Y determines $\rho$ and the relationship is shown by the following equation:

$$\rho = \sqrt{X^2 + Y^2}$$

The value of the angle $\theta$ formed by the resultant with respect to the north or X-axis is shown from the following equation:

$$\theta = \tan^{-1}\frac{Y}{X}$$

The system as illustrated comprises in part a conventional resolver servo system having a resolver 10 formed by rotor windings 11 and 12 in space quadrature and stator windings 13 and 14 also in space quadrature. The stator winding 13 receives an X-voltage input which is a function of the distance of the target north of a given reference point. This distance function is derived from the positioning of north shaft 15 attached to the slider 16 of a potentiometer 17. In like manner, stator member 14 receives a Y-input voltage derived from the positioning of east shaft 18 attached to slider 19 of potentiometer 20. The north and east shafts 15, 18 are operated in known manner to be displaced in amounts representing respectively, the north and east co-ordinates of the position of the target with respect to the origin. Potentiometers 17 and 20 are energized from electrical sources to be later described.

Referring to resolver 10, it can be shown that when stator windings 13 and 14 thereof receive input voltages of the values of X and Y respectively, there is induced in the rotor winding 11 a voltage $E_1$ which may be expressed in terms of $\theta$, X, and Y by the following equation:

$$E_1 = X \sin \theta - Y \cos \theta$$

This voltage is fed to a servo-amplifier 21 and thence to servo motor 22 which drives the rotor of resolver 10 through shaft 23 in a direction which reduces to zero the input voltage to the amplifier 21 so that motor 22 is de-energized. The resulting degree of rotation of the resolver rotor indicates the azimuth $\theta$ which may be read directly from a gauge 24 which is driven by the motor 22 through shaft 23, or the angular displacement of the rotor may be utilized to operate other mechanism remote from the computer.

It can also be readily shown that when the resolver 10 has reached its point of equilibrium, a voltage $E_2$, which represents $\rho$ will be induced in rotor winding 12 which may be expressed in terms of X, Y, $\theta$ in the equation form:

$$E_2 = \rho = X \cos \theta + Y \sin \theta$$

This voltage is fed to an amplifier 25 thence to motor 26 which drives a shaft 27 whose degree of rotation is directly proportional to the range, $\rho$, of the target from the reference point. The motor 26 and shaft 27 are stopped from rotating past the point which represents $\rho$ by means of a potentiometer 28 whose slider 29 is connected at 30 to output of rotor winding 12. Slider 29 is driven by the shaft 27 and is moved with respect to potentiometer 28 until the voltage output thereof is substantially equal to but of opposite polarity to the voltage $E_2$ put into the amplifier 25 from rotor winding 12. Thus the voltage $E_2$ is cancelled out at 30 and the motor 26 and shaft 27 come to rest in the correct position.

There is described above the normal operation of a known resolver servo system for rectangular-to-polar transformation, and in systems of this nature where variation in X and Y input does not exceed the order of between 50 and 1, the computer will deliver results with a high degree of accuracy since it is well known in the art that motor 22 and amplifier 21 can be constructed to deliver substantially uniform results irrespective of whether the input thereto from the resultant voltage derived from X and Y inputs represents 1 or 50 units. However, when the resultant voltage derived from X and Y inputs may vary between limits of the order of 1 and 30,000 units it has been found that a motor-amplifier unit designed to handle a resultant voltage in the upper range limits of input will not, because of motor friction and stray noise input, respond with any degree of reliability to a voltage input derived from low range inputs. Thus, in the computer illustrated, motor 22 may stop short of its true zero position resulting in incorrect voltage being transmitted to range motor 26 so that the resulting computation of both $\rho$ and $\theta$ are incorrect.

This invention provides a novel means for overcoming this difficulty and this means will now be described. Essentially my invention comprises means for increasing the gain of the X and Y potentiometers as the range decreases so that sufficient voltage is delivered to servomotor 22 to cause proper positioning thereof. As illustrated in the lower right hand portion of the drawing, I accomplish this by providing a fixed supply voltage $E_1$ which is delivered to a potentiometer 31 whose slider 32 is actuated by the shaft 27. The arrangement is such that for a slight rotation of shaft 27 (low range) slider 32 is so positioned that a large voltage is delivered by potentiometer 31 to an amplifier 33 which in turn transmits equal voltage of opposite polarity to the terminals of the X and Y potentiometers. Furthermore, for a large rotation of shaft 27 (long range) slider 32 is so positioned that a decreased voltage is delivered to the X and Y potentiometers.

It is this variation in gain in combination with the positioning of X and Y sliders 16 and 19 respectively for various range changes which produces voltage of sufficient magnitude for accurate operation of servomotor 22. In order to prevent the range motor 26 from receiving incorrect signals as a result of variations in the gain of the rotor winding 12 of the resolver 10, one terminal of potentiometer 28 is connected at 34 to the negative output of amplifier 33 so that the above described gain variations are delivered equally but with reversed polarity to the connection point 30 to permit range motor 26 to operate in the manner previously described unaffected by voltage variations induced in rotor winding 12 through the gain variations of potentiometers 17 and 20.

It should be obvious that to vary the gain of the X and Y potentiometers in inverse proportion to $\rho$ variation would merely result in a substantially constant voltage delivery through the X and Y potentiometers irrespective of the positioning of the sliders thereof and thus the system would no longer serve as a computer for the purposes intended. The voltage variation derived from potentiometer 31 therefore, must be some inverse function of $\rho$ which I express in the form:

$$\frac{A}{B+\rho}$$

where A and B are constants whose values are determined by the maximum and minimum voltages which must be delivered by potentiometer 31 through amplifier 33 and applied to the X and Y potentiometers to cause servomotor 22 to respond accurately irrespective of the range magnitude represented by the X and Y inputs.

These maximum and minimum voltages may be expressed as follows:

$$E_{max} = A/B \text{ for zero range}$$

$$E_{min} = \frac{A}{B + \rho_{max}} \text{ for maximum range}$$

If my invention were not utilized in the resolver servo system shown and a fixed voltage was applied to the X and Y potentiometers the output of each potentiometer could be expressed in the following form:

$$E_x = \frac{X}{X_{max}}$$

$$E_y = \frac{Y}{Y_{max}}$$

And the resultant voltage output $E_1$ from the resolver could be expressed:

$$E_1 = \frac{\rho}{\rho_{max}}$$

For a range of 100 yards, for example, where the desired measurable range may vary between 0 to 30,000 yards it can be seen that the output voltage $E_1$ from resolver 10 would substantially equal $\frac{1}{300}$ of a volt which is too small to operate servomotor 22 with any degree of accuracy.

However, when my invention is utilized in the system the resultant $E_1$ of the X and Y voltages can be expressed in the form of the following equation:

$$E_1 = \frac{A}{B+\rho} \times \frac{\rho}{\rho_{max}}$$

With reference to the example cited above, let it be assumed that the values $E_{max}$ and $E_{min}$ for proper gain variation in the X and Y potentiometers are 200 and 10 volts respectively. Thus in the expression:

$$E_{max} = A/B \text{ for zero range}$$
$$A/B = 200 \text{ volts}$$

and in the expression:

$$E_{min} = \frac{A}{B+\rho_{max}} \text{ for maximum range}$$

$$\frac{A}{B+\rho_{max}} = 10 \text{ volts}$$

solving for A and B:

$$A = 316,000$$
$$B = 1,580$$

Substituting these values in the above equation for a range of 100 yards the result is:

$$E_1 = \frac{316,000}{1,680} \times \frac{100}{30,000}$$
$$= .63 \text{ volt}$$

which is sufficient when suitably amplified to accurately operate motor 22 to turn rotor of resolver 10 to a position of zero voltage, which position is an accurate reflection of the X and Y inputs.

It will be observed in the above example that the voltage output from amplifier 33 as determined by the expression, $$\frac{A}{B+\rho}$$

is equal to 182 volts.

This is the gain-increasing voltage which is applied to the X and Y potentiometers 17 and 20 and, with reversed polarity, to the potentiometer 28 thereby effecting thereon an offsetting decrease in gain to permit normal operation of range motor 26 without regard to increased gain in resolver rotor windings 11 and 12.

Since the motion of slider 32 is linear with respect to potentiometer 29, it should be apparent to those skilled in the art that once given the maximum and minimum values to be derived by a computer incorporating my invention, potentiometer 31 can be constructed non-linearly to deliver the required voltage for a given setting of the wiper arm.

It will be apparent that though my invention has been described as applied to a resolver servo system, it need not be limited to such use but may be utilized in a variety of applications where a variable gain input responsive to variations in output can be utilized to stabilize and increase the accuracy of circuits where inputs may vary between extreme values. While one embodiment and method of employing the same has been illustrated, it will be understood that the same is not limited to this embodiment but is capable of a variety of expressions without departing from the spirit of the invention. Reference will therefore be made to the appended claims for a definition of the limits of the invention.

What is claimed is:

1. In an electro-mechanical resolver servo system for computing the resultant of two variable linear input values, a resolver having a pair of input stator windings in space quadrature and a pair of output rotor windings in space quadrature, means for energizing said stator windings in accordance with variable input values, means responsive to the energization of one of said rotor windings for displacing said rotor windings in a direction approaching the angle formed by the resultant of the input values with respect to one of them whereupon the other rotor winding is energized to an extent approaching a value representing the length of said resultant, a variable gain circuit electrically connected at one end to the stator winding energizing means and at the other end to a variable electrical source, means responsive to the energization of said second rotor winding operative on said variable source for varying the energization of the variable gain circuit in accordance with an inverse function of the value of the second rotor winding energization whereby the gain of the input values is increased sufficiently to cause complete movement of the rotor displacing means, and means connecting the variable gain circuit with the output of the second rotor winding for cancelling the increased gain thereof resulting from the increased gain of the stator winding so that the portion of energization of the second rotor winding representing the value of the length of the resultant is unaffected by said gain variations.

2. In an electro-mechanical resolver servo system for computing a resultant function of two linear values, a resolver having a pair of input stator windings in space quadrature and a pair of output rotor windings in space quadrature, means for energizing said stator windings in proportion to the linear values, means responsive to energization of said rotor windings for displacing said rotor windings in a direction approaching the angle formed by the resultant of the linear values whereupon the second of said rotor windings is energized to an extent approaching a value representing the length of the resultant, a variable gain circuit having an input connected to a variable electrical source and an output connected to the stator energizing means, and means responsive to movements of said resolver rotor operative on said variable source for varying the energization of the variable gain circuit in accordance with an inverse function of the energization of the second rotor winding whereby the gain of the stator windings is increased to insure complete movement of the rotor displacing means.

3. In an electro-mechanical computer for electrically making computations involving a resultant vector, the rectangular component vectors of said resultant vector and an angle between said resultant vector and one of said component vectors, means for stabilizing said computer to produce accurate computations of said angle and said resultant vector when the values of said rectangular component vectors are variable between wide limits, comprising a resolver servo system for producing electrical output values representative of the resultant vector and the angle thereof in response to electrical input values representative of the rectangular component vectors, a pair of electric motive means driven in response to said output values the degree of movement of each of said means representing respectively the resultant vector and the angle thereof, means driven by movement of the resultant-vector electric motive means for increasing the gain of the electrical input values upon slight movement of said electric motive means, means for decreasing the gain of the electrical input values upon large movement of said electric motive means, said increase and decrease being proportional to an inverse function of the movements of said electric motive means.

4. In a computer system for producing answer signals in response to input signals variable over wide ranges of values, said system comprising electrically connected input, computer and output circuits, means for stabilizing said system comprising a variable gain circuit connected to said input circuit for amplifying low input signals and having gain varying means therein, means responsive to answer signals for actuating said gain varying means electrically independently of said answer signals but in accordance with an inverse function of the magnitude thereof, and means for superimposing the variable gain circuit signals onto the input signals to amplify said input signals in accordance with an inverse function of the answer signal.

5. In an electrical computer system for producing answer signals in response to a plurality of variable input signals, a computer circuit having input and output terminals, an input circuit connected to said input terminals, a source of electrical supply connected to said input circuit, a variable gain circuit between said source and said input circuit and having gain varying means, an answer circuit connected to the output terminal of said computer, motor means responsive to said answer signal, mechanical means interconnecting said motor means and said gain varying means, said mechanical means actuating said gain varying means to amplify said input signals in accordance with an inverse function of the answer signal.

References Cited in the file of this patent

UNITED STATES PATENTS

| | | |
|---|---|---|
| 2,465,624 | Agins | Mar. 29, 1949 |
| 2,488,780 | Ray | Nov. 22, 1949 |
| 2,528,512 | Greenough | Nov. 7, 1950 |
| 2,574,656 | Peterson | Nov. 13, 1951 |
| 2,653,308 | Allen | Sept. 22, 1953 |
| 2,656,498 | Goodwin | Oct. 20, 1953 |
| 2,656,499 | Goodwin | Oct. 20, 1953 |